US006692423B2

(12) United States Patent
Bohdan et al.

(10) Patent No.: US 6,692,423 B2
(45) Date of Patent: Feb. 17, 2004

(54) METHOD OF SEALING A CIGARETTE CONTAINER

(75) Inventors: Walter Bohdan, Powhatan, VA (US); Samuel D. Johnson, Yorktown, VA (US); Robert H. Coultrip, Yorktown, VA (US); William M. Phillips, Yorktown, VA (US); Carl E. Copeland, Yorktown, VA (US); William E. Hazlett, Chesterfield, VA (US)

(73) Assignee: SASIB Corporation of America, Richmond, VA (US)

( * ) Notice: Subject to any disclaimer, the term of this patent is extended or adjusted under 35 U.S.C. 154(b) by 0 days.

(21) Appl. No.: 09/995,790

(22) Filed: Nov. 29, 2001

(65) Prior Publication Data

US 2003/0100423 A1 May 29, 2003

(51) Int. Cl.[7] .................................................. B31B 7/64
(52) U.S. Cl. ........................ 493/93; 493/217; 493/133; 493/463
(58) Field of Search .......................... 493/217, 93, 148, 493/133; 53/236, 242, 442, 463, 466

(56) References Cited

U.S. PATENT DOCUMENTS

| | | | |
|---|---|---|---|
| 2,037,631 A | | 4/1936 | Hultin |
| 2,867,369 A | * | 1/1959 | Cernera ........................ 229/20 |
| 2,946,168 A | | 7/1960 | Manwaring et al. |
| 4,502,908 A | | 3/1985 | Von Wichert et al. |
| 4,521,659 A | | 6/1985 | Buckley et al. |
| 4,585,503 A | | 4/1986 | Von Wichert et al. |
| 4,641,482 A | | 2/1987 | Metz |
| 4,707,213 A | | 11/1987 | Mohr et al. |
| 4,727,706 A | * | 3/1988 | Beer ............................ 53/434 |
| 4,887,408 A | * | 12/1989 | Mattei et al. ................. 53/412 |
| 4,981,006 A | | 1/1991 | Caenazzo et al. |
| 5,048,260 A | | 9/1991 | Raymond et al. |
| 5,179,814 A | | 1/1993 | Osti et al. |
| 5,350,902 A | | 9/1994 | Fox et al. |
| 5,680,747 A | | 10/1997 | Spatafora et al. |
| 5,701,725 A | | 12/1997 | Neri et al. |
| 5,729,957 A | | 3/1998 | Spada |
| 5,839,253 A | | 11/1998 | Draghetti |
| 6,474,046 B1 | * | 11/2002 | Ours et al. .................... 53/432 |

* cited by examiner

Primary Examiner—Rinaldi I. Rada
Assistant Examiner—Gloria R Weeks
(74) Attorney, Agent, or Firm—Larson & Taylor PLC

(57) ABSTRACT

A method for making a cigarette container wherein a hollow container body is constructed having an open end which includes a step portion defining a surrounding rim and interior abutments. A plug is prepared which is sized to be received between the rim of the body and to abut the abutments. The plug includes a main plate, a metal layer attached to the main plate, and a heat activated adhesive located adjacent the metal layer and positioned to be immediately adjacent the step portion. An induction heating device is then located adjacent the open end of the body, and activated to heat the metal layer and hence to heat the adjacent adhesive so that after cooling the plug is bonded to the body by the adhesive and the plug thus permanently closes the open end of the body.

6 Claims, 2 Drawing Sheets

METHOD OF SEALING A CIGARETTE CONTAINER

FIELD OF THE INVENTION

The present invention relates generally to a method of sealing cigarette packages and containers, and more particularly to a method for sealing a cigarette container having an induction heated adhesive bonding a bottom panel to a main body.

BACKGROUND OF THE INVENTION

Cigarette packages and containers that protect the cigarettes from crushing and/or preserve the freshness of the cigarettes are known in the prior art. Typically, such prior art packages are box-shaped containers made of a paper or cardstock material in either a "softpack" or "hardpack" form. Softpack packages are capable of retaining a measure of freshness, but softpack packages typically offer little or no protection against crushing. Hardpack packages do help to preserve freshness to some extent and do offer some protection against crushing.

Other materials, such as metals, woods and plastic, have also been suggested for making crushproof and freshness-preserving cigarette containers, but have never attained widespread acceptance because of their typically high manufacturing costs. However, with the advancement of plastic manufacturing technology, it has become more cost effective for cigarette manufacturers to use plastic materials for cigarette containers. U.S. Pat. Nos. 2,867,369 to Cernera and 3,223,275 to Rice, Jr. disclose cigarette containers that may be made out of various materials, such as plastic, wood, metal and cardboard. The use of a plastic container molded from a polymeric material having a relatively low permeability or impermeability would eliminate the need to use wrappers and overwraps or, alternatively, in conjunction with such wrappers and overwraps, the air impermeability of molded plastic containers would be further enhanced.

It would therefore be desirable to be able to provide a cigarette container made of whatever desired material which could be easily and cheaply made.

SUMMARY OF THE INVENTION

The present invention is directed to a critical step in the making of a novel cigarette container of any selected material, especially plastic. Although the cigarette container of the invention may be configured in a number of forms that are not specifically illustrated herein, one preferred embodiment of the container comprises a six-sided box which forms a box-shaped container.

According to the method of the present invention for making a cigarette container, a hollow container body is constructed having an open end. The open end includes a step portion defining a surrounding rim and interior abutments. A plug is also prepared which is sized to be received between the rim of the body and to abut the abutments. The plug includes a main plate, a metal layer attached to the main plate, and a heat activated adhesive located adjacent the metal layer and positioned to be immediately adjacent the step portion when the plug is inserted in the open end of the body and the plug contacts the abutments. The main plate is placed in the open end of the body so that the adhesive is disposed between the step portion and the main plate. An induction heating device is then located adjacent the open end of the body, and activated to heat the metal layer and hence to heat the adjacent adhesive so that after cooling the plug is bonded to the body by the adhesive and the plug thus permanently closes the open end of the body.

In one embodiment, the preparing step includes the locating of the adhesive on a top surface of the plate between a border edge of the metal layer and a border edge of the plate. In another embodiment, the preparing step includes the locating of the adhesive on a side edge of the plate below a top surface of the plate either in addition to, or alternatively to, the adhesive on the top surface. In still another embodiment, the preparing step includes the securing of the metal layer to a top surface of the plate, and the locating of the adhesive on a top surface of the metal layer.

In the preferred embodiment, the activating step includes the heating of the metal layer to bring the adhesive to a temperature of less than 200° F. This activating step also includes the excitation of the induction heating device at about 1600 Hz.

The disclosed container is preferably made of two components, namely, a body comprising an integral open-ended body and lid, and the flat plug. The flat plug is conveniently die-cut from a flat sheet of a plastic/metal, e.g., a polypropylene/aluminum foil laminate or injection molded of a plastic material, e.g., polypropylene, with a metal foil substrate, such as aluminum foil, bonded to one surface thereof.

The induction heating device for heat-seating the bottom panel to the container body comprises a sealer head made of a non- or low-heat conducting material in which is formed a cavity corresponding in size and geometrical shape to the bottom end of the container. A coil is wound inside the sealer head about the cavity and is energized by electrical energy to generate a magnetic field in the cavity. When a container is positioned in the cavity, the coil is energized to a level that causes the heat-activated adhesive only on the edges of the base in contact with the step portion to be activated.

The induction heating technique described above is preferred because of a number of unique advantages over other techniques. For example, the contacting portions of the base and body may be bonded by other types of adhesives, and/or by ultrasonic or laser welding or other techniques that will be apparent to those of skill in the art. However such techniques are not as quick, easy to control, or available for use in high speed machines as the induction heating technique of the present invention.

Another advantage of the present invention is that the heat induction technique produces little or no out-gassing which may adversely effect the flavor of the adjacent cigarettes. With ultrasonic or laser heating of an adhesive, relatively greater out-gassing is produced.

Still another advantage of the present invention is that when using a heat activated adhesive, it is relatively easy to control the temperature to which the adhesive is heated compared to laser and ultrasonic types of heating.

With the foregoing and other advantages and features of the invention that will become hereinafter apparent, the nature of the invention may be more clearly understood by reference to the following detailed description of the invention, the appended claims and the views illustrated in the drawings.

DETAILED DESCRIPTION OF THE INVENTION

Figure 1:
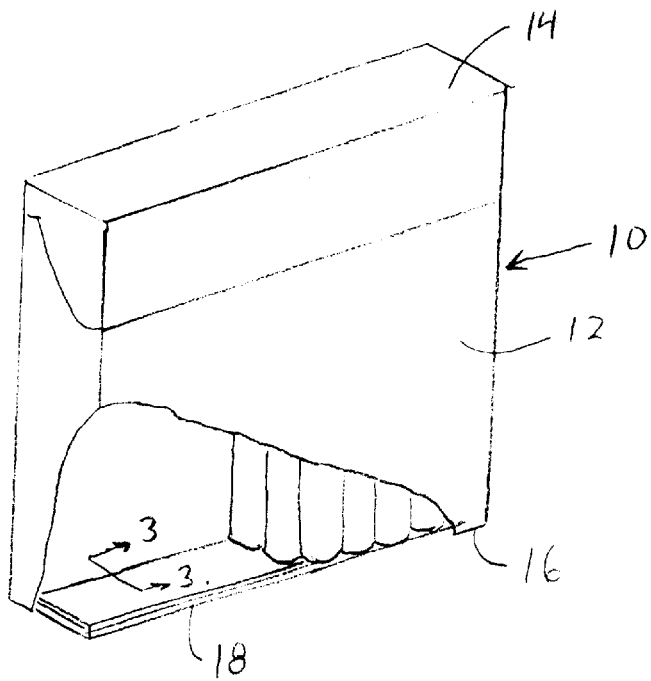
FIG. 1 is a front perspective view of an exemplary cigarette container, partly broken away to show the interior of the container.

Referring now to the drawings in detail, FIG. 1 is a front perspective view of a cigarette container 10 manufactured in accordance with the present invention. Container 10 is shown in the closed position thereof, with some cigarettes C shown in the broken away part. The container 10 is a generally hollow rectangular box, though other configurations consistent with the present invention are possible. Container 10 is conventionally designed to hold twenty cigarettes C, typically in a 7-6-7 configuration, although other packing configurations and numbers of cigarettes are possible as desired.

Container 10 broadly comprises two components: a body 12 having an integral lid 14 and an open bottom end 16; and a bottom panel 18 which is bonded to bottom end 16 to close body 12. If desired, both body 12 and bottom panel 18 can be made of a plastic material having a low permeability, but other materials or combinations of materials as desired and known in the art are also possible. As shown in greater detail in FIG. 3, bottom end 16 of body 12 is constructed with a perimetrical step portion 20. Step portion 20 defines a surrounding rim 22 and interior abutments 24.

Figure 2:
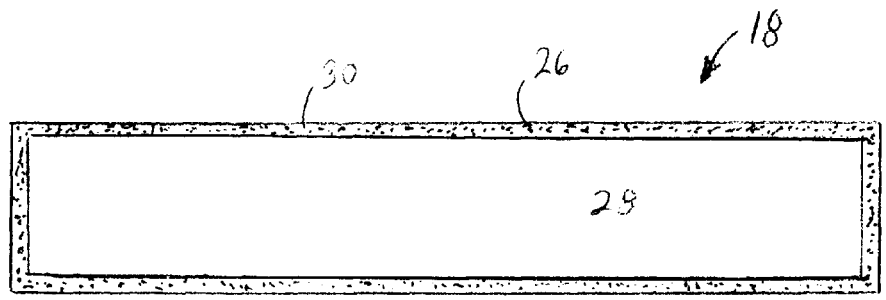
FIG. 2 is a top plan view showing the plug of the cigarette container.
Figure 3:
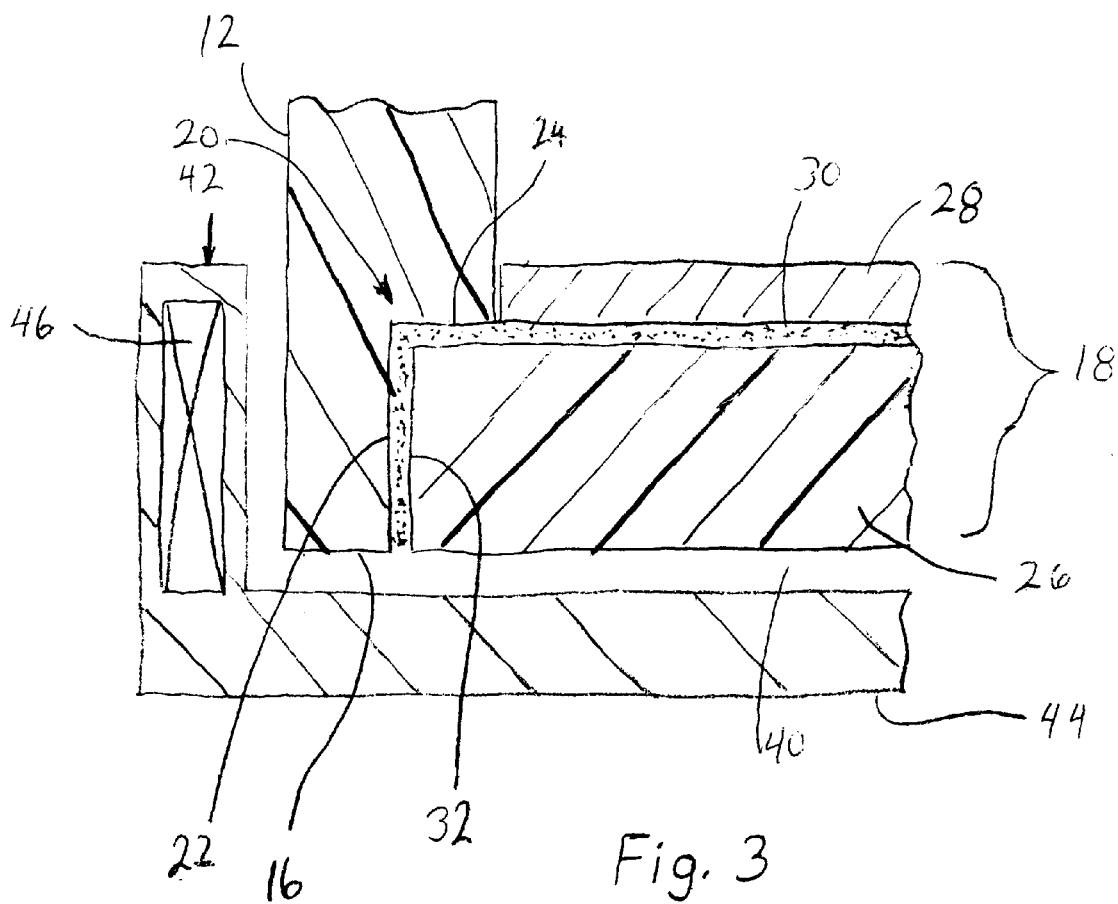
FIG. 3 is a cross-sectional detail view of the cigarette container taken along the line 3—3 of FIG. 1 and showing the connection being made between the body and the plug with the induction heating device.

As shown in better detail in FIGS. 2 and 3, bottom panel 18 is formed as a main plate 26 having a top surface to which a flat metal layer 28 such as aluminum foil is securely attached. Metal layer 28 is smaller than the top of main plate 26, so that a peripheral border area is provided between a border edge of metal layer 28 and a border edge of main plate 26. Located on this border area is a heat activated adhesive 30. If desired, and as shown in FIG. 3, adhesive 30 can also be located on a side edge 32 of main plate 26 as well (or alternatively as discussed below). Bottom panel 18 is sized to fit inside bottom end 16 of body 12 with adhesive 30 located on the border area of main plate 26 contacting abutments 24 as shown in FIG. 3. Conveniently, as shown in FIG. 3, adhesive 30 is used as well to attach metal layer 28 to the top of main plate 26. However, metal layer 28 could also be separately attached to main plate 26 and adhesive 30 located in the border area only rather than over the entire surface as preferred.

Bottom panel 18 is attached to bottom end 16 of container body 12 in a process as shown in FIG. 3. Conveniently, open bottom end 16 of container body 12 is oriented upwardly (opposite to the orientation shown in FIG. 3), with the cigarettes C already loaded therein. Next, bottom panel 18 is inserted into open bottom end 16 to close bottom end 16. Bottom panel 18 is inserted into bottom end 16 so that adhesive 30 located on the border edge of main plate 20 abuts abutments 24 of step portion 20. When main plate 20 is fully urged into bottom end 16 of container body 12, if present, adhesive 30 on side edge 32 abuts the inside wall of rim 22 as well. It will be appreciated that the outermost surface of main plate 26 is positioned flush with the end surface of body 12 when main plate 26 is fully inserted.

After main plate 26 is inserted in bottom end 16, container 10 is then placed in an appropriately shaped cavity 40 of a sealer head 42 of an induction heating device 44. A coil 46 of the induction heating device 44 is then energized, preferably at about 1600 Hz, so that metal layer 28 close thereto is quickly and controllably induction heated. This induction heating of metal layer 28 in turn heats adhesive 30, especially in the border area between the main plate edge and the metal layer edge. Adhesive 30 is heated to below 200° F., but above the activating point thereof, so that bonding of main plate 26 to step portion 20 takes place. As shown in FIG. 3, this bonding takes place between main plate 26 and both abutments 24 as well as the interior walls of rim 22 in this preferred embodiment. Where the induction heating process activates adhesive 30 inwardly beyond the border edge of metal layer 28, metal layer 28 prevents adhesive 30 from coming into contact with and sticking to the ends of cigarettes C in container 10.

It will be appreciated that metal layer 28 functions as a heat sink for absorbing the heat of induction and rapidly melting the heat-activated adhesive 30. The induction heating process is preferred since it produces little or no outgassing (depending on the adhesive used), and since it can be performed quickly to achieve high production speeds for container 10. After container 10 is removed from sealer head 42 and cooled, the main plate 26 is securely bonded to bottom end 16 of container body 22. This bonding produces an air tight seal.

Figure 4:
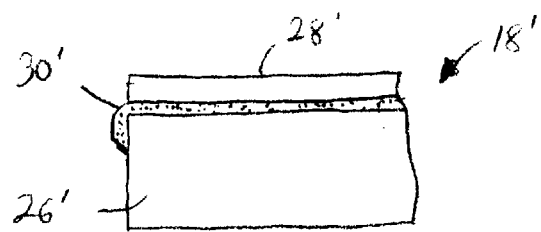
FIG. 4 is a side view of an alternative embodiment of a bottom panel.

Depicted in FIG. 4 is a side view of an alternative embodiment of a bottom panel 18'. As bottom panel 18' is broadly similar to bottom panel 18, similar elements to bottom panel 18 will be identified with the same numerals with the addition of a prime ('). Bottom panel 18' includes a main plate 26' to which a metal layer 28' is securely attached by adhesive 30'. Bottom panel 18' is conveniently cut from a large sheet, which cutting causes adhesive 30' to be spread over a top portion of side edge 32 as shown. It is thus this spread over adhesive 30' which is then used to attach main plate 26' to bottom end 16 in the same process as described above with respect to main plate 26.

Figure 5:
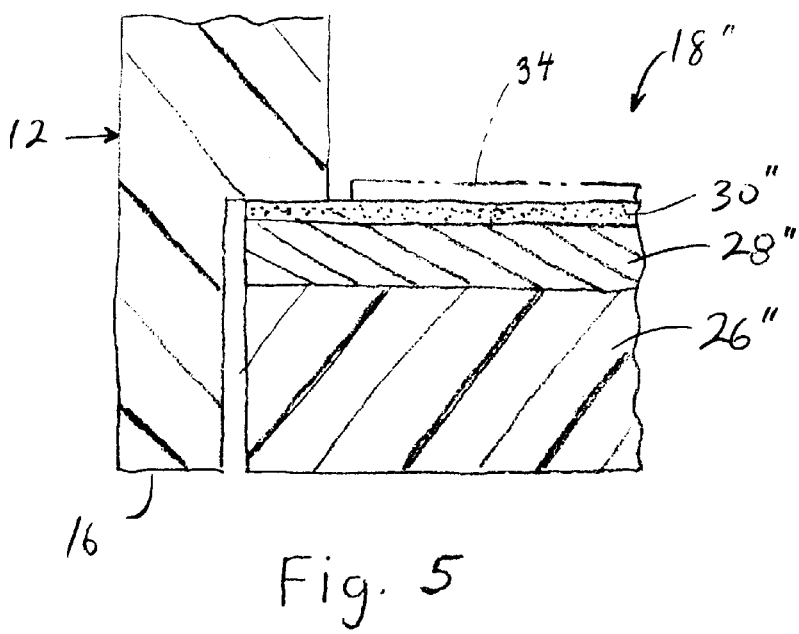
FIG. 5 is a side view of another alternative embodiment of a bottom panel.

Depicted in FIG. 5 is a side view of another alternative embodiment of a bottom panel 18". As bottom panel 18" is broadly similar to bottom panels 18 and 18', similar elements to bottom panels 18 and 18' will be identified with the same numerals with the addition of a double prime ("). Bottom panel 18" includes a main plate 26" to which a metal layer 28" is integrally attached. On top of metal layer 28" is adhesive 30". As with bottom panel 18', bottom panel 18" is similarly conveniently cut from a large sheet. After heating and cooling of adhesive 30", adhesive 30" securely attaches main plate 26" to bottom end 16 in the same process as described above with respect to main plate 26 or 26'. It will be appreciated that if a crystallizing adhesive 30" is used, there should be no problem with adhering of the cigarette bottoms to adhesive 30". However, if adhesive 30" does produce such problems, a paper liner 34 (shown in a chained line) can be provided on top of adhesive 30".

While the present invention has been described with respect to exemplary embodiments thereof, it will be understood by those of ordinary skill in the art that variations and modifications can be effected within the scope and spirit of the invention.

We claim:

1. A method for making a cigarette container comprising the steps of:
   constructing a hollow container body having an open end, the open end including a step portion defining a surrounding rim and interior abutments;

preparing a plug which is sized to be received between the rim of the body and to contact the abutments, the plug including a main plate, a metal layer attached to the main plate, and a heat activated adhesive located adjacent the metal layer and positioned to be immediately adjacent the step portion when the plug is inserted in the open end of the body and the plug contacts the abutments;

placing the main plate in the open end of the body so that the adhesive is disposed between the step portion and the main plate;

locating an induction heating device adjacent the open end of the body; and activating the induction heating device to heat the metal layer and hence to heat the adjacent adhesive so that after cooling the plug is bonded to the body by the adhesive and the plug thus permanently closes the open end of the body.

2. A method for making a cigarette container as claimed in claim 1, wherein said preparing step includes the locating of the adhesive on a top surface of the plate between a border edge of the metal layer and a border edge of the plate.

3. A method for making a cigarette container as claimed in claim 1, wherein said preparing step includes the locating of the adhesive on a side edge of the plate below a top surface of the plate.

4. A method for making a cigarette container as claimed in claim 1, wherein said preparing step includes the securing of the metal layer to a top surface of the plate, and the locating of the adhesive on a top surface of the metal layer.

5. A method for making a cigarette container as claimed in claim 1, wherein said activating step includes the heating of the metal layer to bring the adhesive to a temperature of less than 200° F.

6. A method for making a cigarette container as claimed in claim 1, wherein said activating step includes the excitation of the induction heating device at about 1600 Hz.

* * * * *